US010698267B2

(12) United States Patent
Koppal et al.

(10) Patent No.: US 10,698,267 B2
(45) Date of Patent: Jun. 30, 2020

(54) PROTECTIVE LAYERS IN DISPLAY DEVICE (71) Applicant: Microsoft Technology Licensing, LLC, Redmond, WA (US)

(72) Inventors: Rohit Krishna Koppal, Sammamish, WA (US); Chandrashekar Gernipalli Subba, Redmond, WA (US); Ronald B. Smith, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/587,356

(22) Filed: May 4, 2017

(65) Prior Publication Data

US 2018/0321534 A1 Nov. 8, 2018

(51) Int. Cl.
| | |
|---|---|
| *G02F 1/1339* | (2006.01) |
| *G02F 1/1337* | (2006.01) |
| *G02F 1/13357* | (2006.01) |
| *G02F 1/1333* | (2006.01) |
| *G02B 1/14* | (2015.01) |

(52) U.S. Cl.
CPC ........ *G02F 1/13394* (2013.01); *G02F 1/1336* (2013.01); *G02F 1/1337* (2013.01); *G02F 1/133723* (2013.01); *G02B 1/14* (2015.01); *G02F 1/13338* (2013.01); *G02F 2001/13396* (2013.01); *G02F 2201/50* (2013.01)

(58) Field of Classification Search
CPC ............... G02F 1/13394; G02F 1/1337; G02F 1/133723; G02F 2001/13396; G02F 2201/50; G02B 1/14
See application file for complete search history.

(56) References Cited

U.S. PATENT DOCUMENTS

| | | | |
|---|---|---|---|
| 6,166,797 A | 12/2000 | Bruzzone et al. | |
| 8,497,965 B2 * | 7/2013 | Cho | G02F 1/136286 349/129 |
| 10,018,877 B2 * | 7/2018 | Cho | G02F 1/13394 |
| 2006/0044837 A1 * | 3/2006 | Lee | G02B 6/0036 362/632 |
| 2006/0139538 A1 | 6/2006 | Park | |
| 2007/0110923 A1 | 5/2007 | Chen et al. | |
| 2008/0055937 A1 | 3/2008 | Chuang et al. | |

(Continued)

FOREIGN PATENT DOCUMENTS

| | | | |
|---|---|---|---|
| JP | 2006195111 A | * | 7/2006 |
| KR | 20130134065 A | | 12/2013 |
| WO | 2014073894 A1 | | 5/2014 |

OTHER PUBLICATIONS

Cui, et al., "Alignment Layers with Variable Anchoring Strengths from Polyvinyl Alcohol", In Journal of Applied Physics, vol. 111, Issue 6, Mar. 27, 2012, 9 pages.

(Continued)

*Primary Examiner* — Jessica M Merlin
(74) *Attorney, Agent, or Firm* — Holzer Patel Drennan (57) ABSTRACT

A device is disclosed, which may include a color-filter layer and a thin-film transistor (TFT) layer. The TFT layer may have an alignment layer. The device may have spacers, between the color-filter layer and the TFT layer, that form space between the color-filter layer and the TFT layer for liquid crystals. The device may include a scratch-resistant coating on the alignment layer of the TFT layer.

20 Claims, 9 Drawing Sheets

(56) References Cited

U.S. PATENT DOCUMENTS

| | | | |
|---|---|---|---|
| 2011/0117339 A1 | 5/2011 | Baek et al. | |
| 2012/0045619 A1* | 2/2012 | Ando | B29D 11/00269 |
| | | | 428/161 |
| 2013/0100680 A1 | 4/2013 | Jin et al. | |
| 2013/0300964 A1 | 11/2013 | Zhong | |
| 2015/0253607 A1* | 9/2015 | Cho | G02F 1/13394 |
| | | | 349/110 |
| 2015/0253608 A1* | 9/2015 | Cho | G02F 1/13394 |
| | | | 349/110 |
| 2015/0301271 A1* | 10/2015 | Ouderkirk | G02B 6/0081 |
| | | | 349/65 |
| 2015/0316809 A1 | 11/2015 | Hong et al. | |
| 2015/0346533 A1 | 12/2015 | Park et al. | |
| 2016/0085105 A1* | 3/2016 | Jeon | G02F 1/136286 |
| | | | 349/110 |
| 2016/0377900 A1* | 12/2016 | Qu | G02F 1/13394 |
| | | | 349/106 |
| 2017/0090233 A1* | 3/2017 | Xu | G02F 1/133514 |

OTHER PUBLICATIONS

"International Search Report and Written Opinion issued in PCT Application No. PCT/US2018/028464," dated Jul. 18, 2018, 13 Pages.

* cited by examiner

PROTECTIVE LAYERS IN DISPLAY DEVICE

BACKGROUND

Consumers often prefer that mobile devices, such as tablet computers, mobile telephones, and laptops, are thin and light. To achieve thin and light devices, designers may choose to reduce the weight and thickness of the display, housing, and chassis that hold and protect the components within the devices. Lighter and thinner displays, housings, and chassis, however, may make the components of the mobile device more prone to failure. For example, excessive force applied to a display or bending of the device (and hence the display) may cause defects, such as black spots or incorrect color rendering.

DESCRIPTION

The following detailed description refers to the accompanying drawings. The same reference numbers in different drawings may identify the same or similar elements. Also, the following detailed description is exemplary and explanatory only and is not restrictive of the invention, as claimed.

A display device, such as a tablet or notebook computer, has a housing or a chassis to hold and protect the components of the device, such as its display. All too often, users abuse their devices intentionally or unintentionally. For example, users may drop, step on, bend, or push their devices, which may cause displays to fail. As manufactures design lighter and thinner devices to improve user experience, devices lose stiffness and displays become even more prone to failing. Although users may be happy with a lighter and thinner device, users are generally not happy when their display fails. Embodiment described below may allow for extra protection to screens that are pushed or bent, for example.

Figure 1:
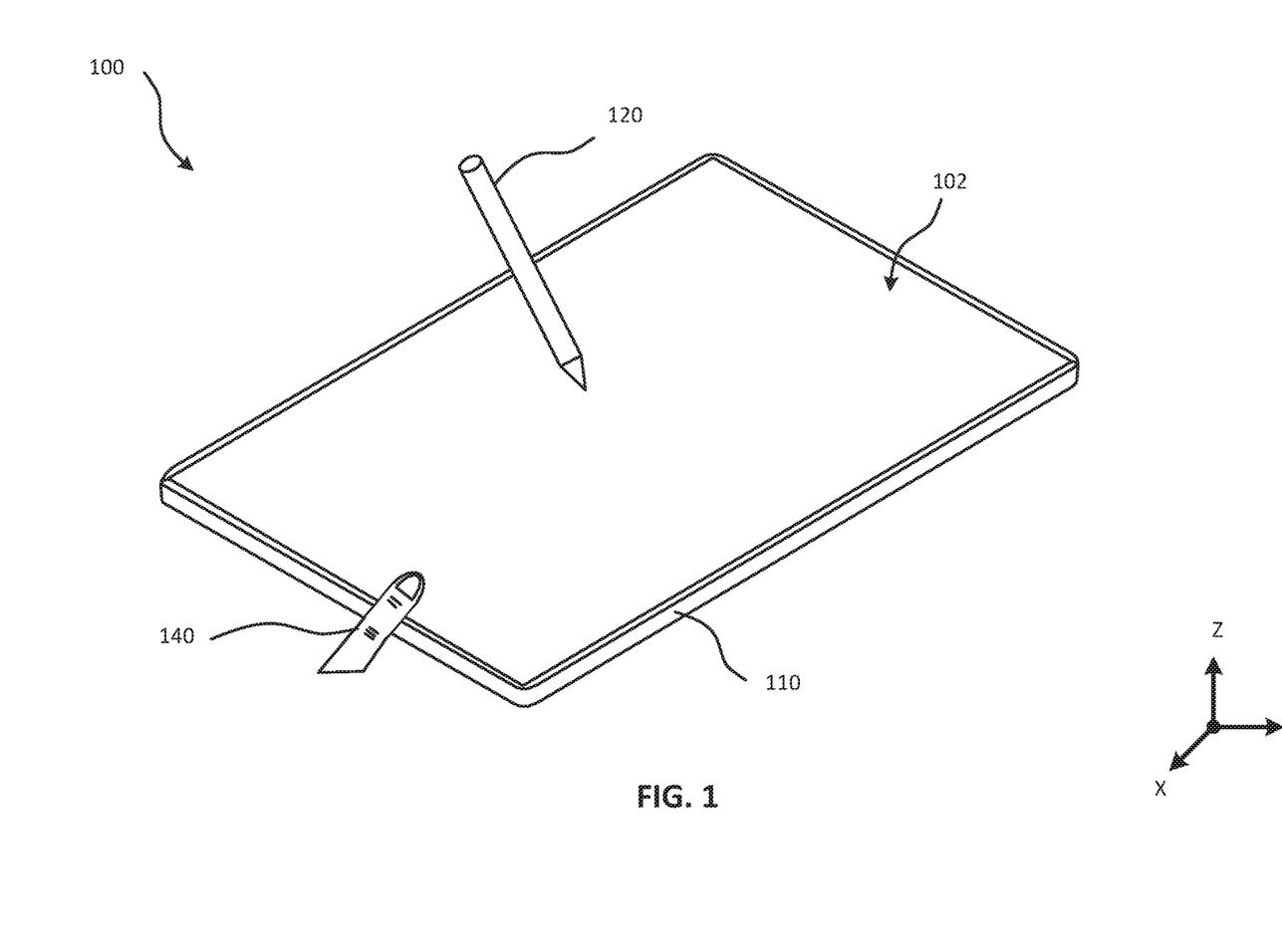
FIG. 1 illustrates an exemplary display device in one embodiment.

FIG. 1 is a perspective view of an exemplary display device 100, in one embodiment, manifest as a tablet computer. Display device 100 includes a display 102 surrounded by a housing 110 to encompass and protect the components of display device 100, including display 102. Display 102 shows images and/or video for viewing by a user. An object, such as a stylus or pen 120 and/or a fingertip 140, interacts with a display 102 of a display device 100. Display 102 may include sensing circuitry to receive input from pen 120, fingertip 140, a palm (not shown), hand (not shown), or multiple fingertips (not shown). Although display device 100 is shown as a tablet computer in FIG. 1, display device 100 may be a mobile phone, a laptop, or any other device with a display for viewing. FIG. 1 also defines an x-axis, y-axis, and z-axis such that the exposed layer of display 102 is the "top most" layer and the "bottom" of display device 100 is not visible in FIG. 1. These terms are relative and may be interchanged.

Even though housing 110 protects display 102, if a force is imparted directly on display 102 or if housing 110 experiences sufficient forces (e.g., by falling or bending), display 102 may deform and fail. For example, if display device 100 is bent or if pen 120 or fingertip 140 exerts excessive pressure on display 102, display 102 could fail by rendering color incorrectly or displaying a dark or light spot. Such a failure may result from strain (e.g., a force) deforming, warping, or moving a component of display 102. As an example, FIGS. 2A through 2C illustrate components of display 102 that may deform or warp to cause a failure.

Figure 2A:
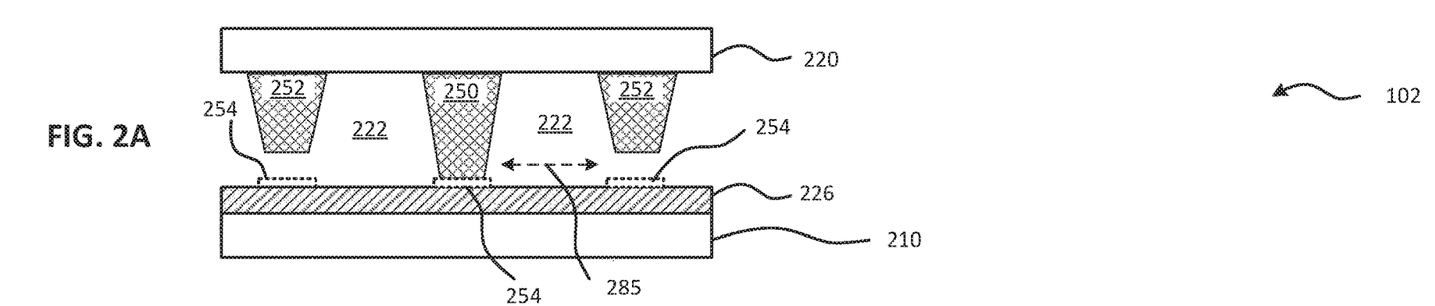
FIGS. 2A, 2B, 2C, 2D, and 2E illustrate an exemplary cross section of a display experiencing a force that causes a failure.
Figure 2B:
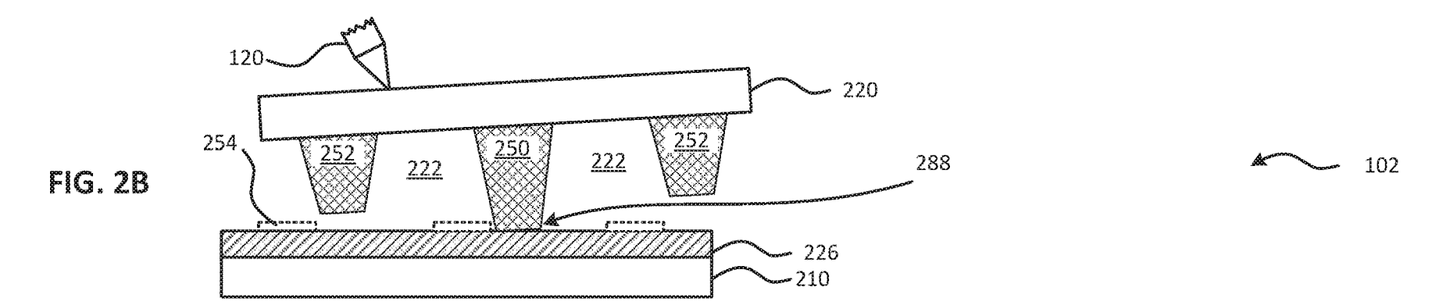
Figure 2C:
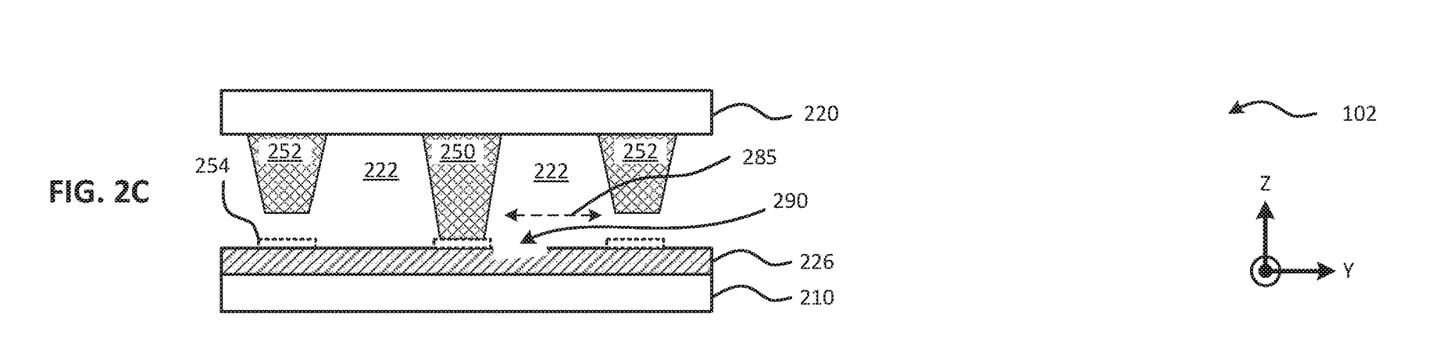

FIGS. 2A through 2E illustrate a cross section of display 102 experiencing a force that causes a failure. As shown in FIG. 2A, display 102 includes a thin-film transistor (TFT) layer 210 and a color-filter layer 220. Liquid crystals 222 lie between the color-filter layer 220 and TFT layer 210. An alignment layer 226 lays on top of TFT layer 210 and determines the alignment direction of liquid crystals 222. Alignment layer 226 may be formed of polyimide (PI), for example. Main spacers 250 maintain a cell gap between TFT layer 210 and color-filter layer 220. Display 102 may include an array of main spacers 250. One of the main spacers 250 is shown in FIG. 2A and is referred to individually as "main spacer 250." Sub-spacers 252 maintain a gap between themselves and alignment layer 226 of TFT layer 210. Display 102 may include an array of sub-spacers 252. Two sub-spacers 252 are shown in FIG. 2A and may be referred to individually as "sub-spacer 252." Thus, spacers 250, 252 between the color-filter layer and the TFT layer form space between the layers for liquid crystals.

Landing areas 254 may accommodate spacers 250, 252. In FIGS. 2A through 2E, landing areas 254 are shown with dashed lines to indicate that landing areas 254 may or may not include a step height. Landing areas 254 may include the surface of alignment layer 226, for example. Landing areas 254 include the space between adjacent pixels in the TFT layer 210 and, in the case of main spacer 250, allow for safe contact of main spacer 250 with alignment layer 226 and TFT layer 210. Three landing areas 254 are shown in FIG. 2A and may be referred to individually as "landing area 254." An aperture area 285 lies between spacers 250, 252 and is the area via which light passes to the color-filter layer 220 and then to the user. In one embodiment, aperture area 285 does not include landing areas 254. That is, in one embodiment, landing areas 254 do not include aperture areas, such as aperture area 285. Although not shown in FIGS. 2A through 2E, alignment layer 226 may cover landing areas 254 in one embodiment.

FIG. 2B shows pen 120 applying pressure to the surface of display 102. When pen 120 (and/or fingertip 140) touches display 102, pressure is applied to display 102. The pressure may cause color-filter layer 220 to move, and main spacer 250 and/or sub-spacers 252 may also move. In the example of FIG. 2B, main spacer 250 has moved past landing area 254 and contacts alignment layer 226 at contact point 288 (which is in aperture area 285 as shown in FIG. 2A). In this example, the contact between main spacer 250 and alignment layer 226 causes damage (e.g., a scratch) to alignment layer 226. When pen 120 (and/or fingertip 140) is removed pressure is released, color-filter layer 220 may return to its original position as shown in FIG. 2C. Main spacer 250 and/or sub-spacers 252 may also move to their original position on top of landing area 254, which may leave a scratch 290 in alignment layer 226. In this example, the scratch is in aperture area 285, i.e., the area through which light passes to the color filter layer 220 and then to the user.

Figure 2D:
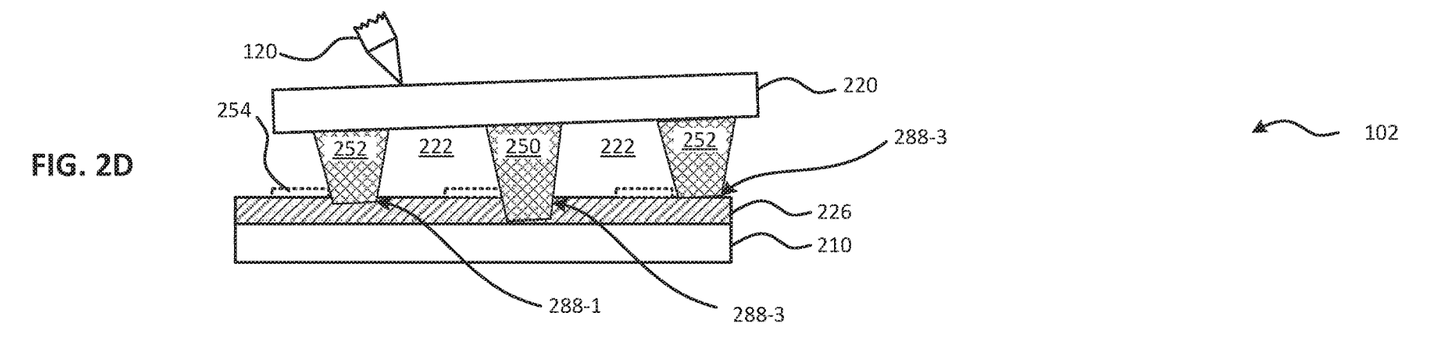
Figure 2E:
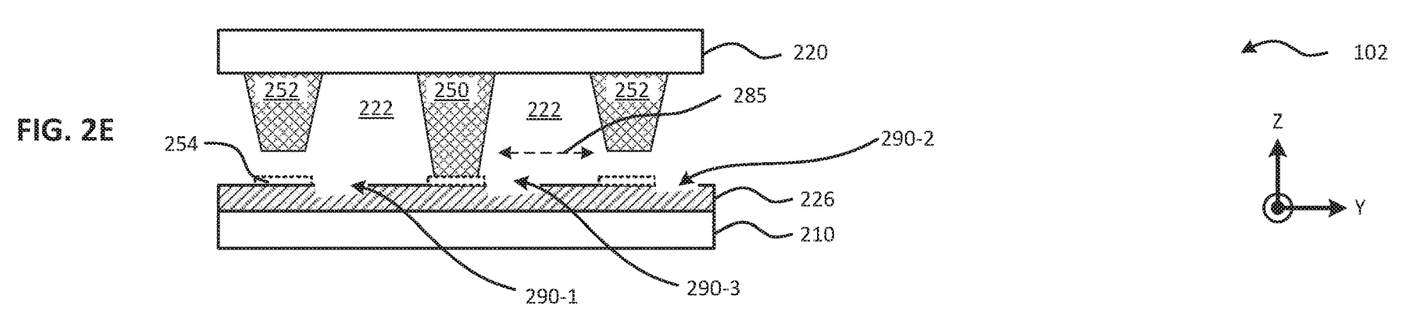

Like FIG. 2B, FIG. 2D shows pen 120 applying pressure to the surface of display 102. In this case, the pressure causes color-filter layer 220 to move, and main spacer 250 and/or sub-spacers 252 may also move. In the example of FIG. 2D, sub-spacers 252 has moved past landing areas 254 and contacts alignment layer 226 at contact points 288-1 and 288-2 (which is in aperture area 285 as shown in FIG. 2A). In addition, main spacer 250 has moved past landing area 254 and contacts alignment layer 226 at contact point 288-3 (which is in aperture area 285 as shown in FIG. 2A). In this example, the contact between sub-spacers 252 and alignment layer 226 causes damage (e.g., a scratch) to alignment layer 226. Further, the contact between main spacers 250 and alignment layer 226 may cause damage (e.g., a scratch) to alignment layer 226. When pen 120 (and/or fingertip 140) is removed, the pressure is released and color-filter layer 220 may return to its original position as shown in FIG. 2D. Main spacers 250 and sub-spacers 252 may also move to their original position on top of landing area 254, which may leave scratches 290-1, 290-2, and/or 290-3 in alignment layer 226. In this example, the scratches are in aperture areas, i.e., the area through which light passes to the color filter layer 220 and then to the user.

Thus, when an external force is sufficiently strong, main spacer 250 and/or sub-spacers 252 may move and damage (e.g., scratch) alignment layer 226. When an alignment layer 226 is damaged, the alignment direction may change. When an alignment direction is changed because of a scratch, for example, liquid crystal molecules are aligned in a different direction and transmittance of light is changed. As a result, the damage may cause incorrect color rendering (e.g., a blue, green, and/or red mura defect), non-uniform color rendering, a light spot, and/or a dark spot. While physical protection may be increased (e.g., increasing the size of landing areas 254) or light surrounding landing areas may be blocked (e.g., via black matrix), these solutions may reduce the brightness of a display because of reduced pixel aperture. Compensating for reduced inherent brightness in this way may require more power leading to reduced battery life.

FIGS. 2A through 2C are exemplary and do not show all components of an LCD. For example, display 102 may also include a second alignment layer that lies beneath color-filter layer 220. Display 102 may also include a black matrix that corresponds to main spacer 250 and sub-spacers 252. As noted above, landing areas 254 may not have a step height and/or alignment layer 226 may cover landing areas 254. Further, a "display" may mean modular components of a display, such as TFT layer 210, color-filter layer 220, and the components therebetween.

Figure 3A:
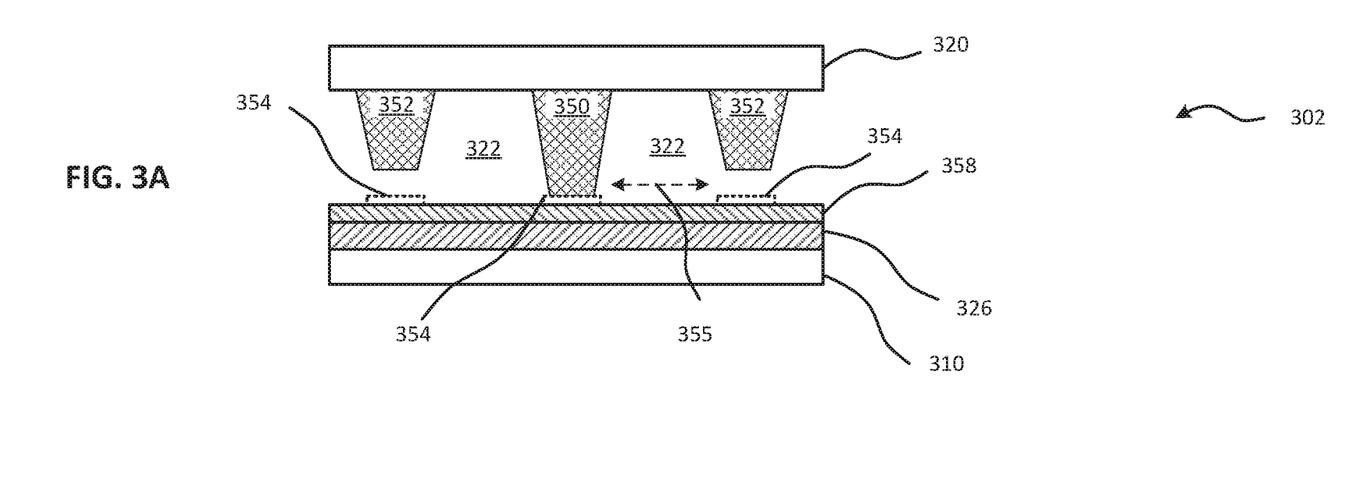
FIGS. 3A, 3B, and 3C illustrate exemplary cross-sectional views of a display in one embodiment.
Figure 3B:
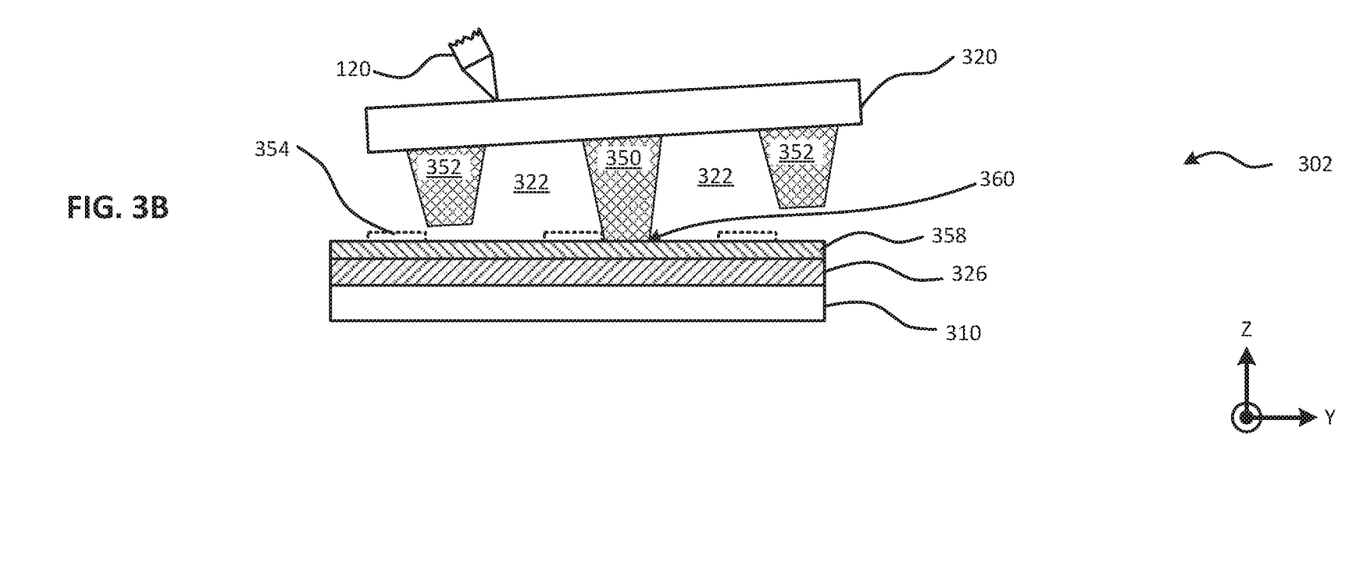
Figure 3C:
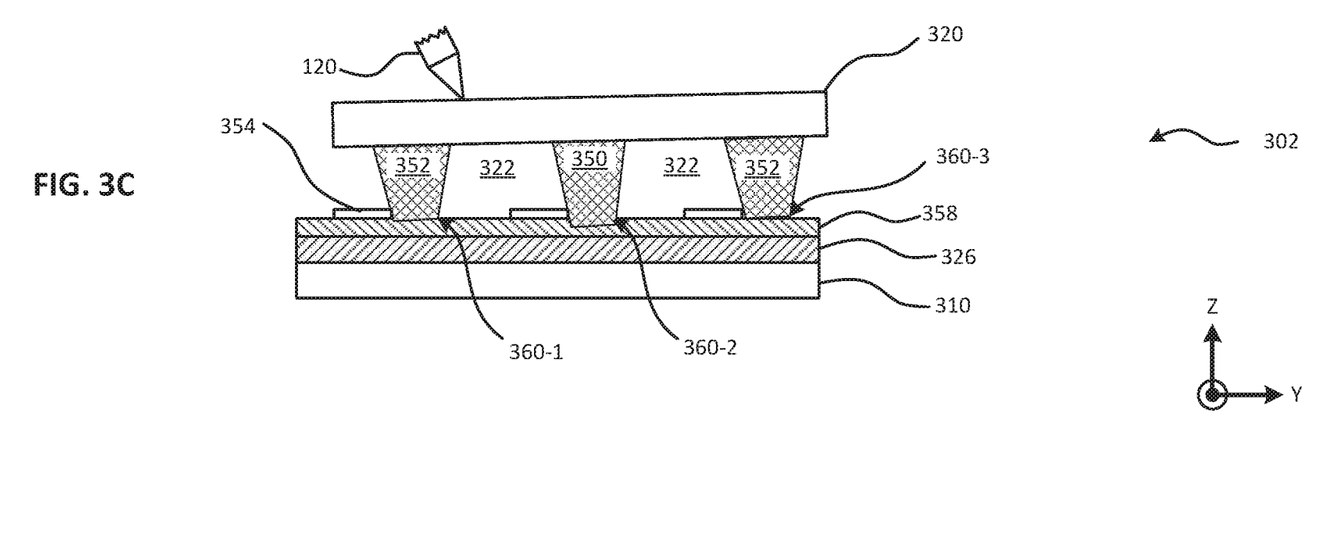

FIGS. 3A, 3B, and 3C are an exemplary cross-sectional view of a display in one embodiment. As shown in FIG. 3A, display 302 includes a TFT layer 310 and a color-filter layer 320. Liquid crystals 322 lie between the color-filter layer 320 and TFT layer 310. An alignment layer 326 lays on top of TFT layer 310 and determines the alignment direction of liquid crystals 322. Alignment layer 326 may be formed of polyimide (PI), for example. A main spacer 350 maintains a cell gap between TFT layer 310 and color-filter layer 320. Display 302 may include an array of main spacers 350, with one shown in FIGS. 3A and 3B. Sub-spacers 352 maintain a gap between themselves and alignment layer 326 of TFT layer 310. Display 302 may include an array of sub-spacers 352, with two being shown in FIGS. 3A and 3B. Thus, in FIGS. 3A and 3B, the spacers between the color-filter layer and the TFT layer form space between the layers for liquid crystals Landing areas 354 accommodate spacers 350, 352. In FIGS. 3A through 3C, landing areas 354 are shown with dashed lines to indicate that landing areas 354 may or may not include a step height. Landing areas 354 may include the surface of alignment layer 326 and/or coating 358, for example. Landing areas 354 include the space between adjacent pixels in the TFT layer 310 and, in the case of main spacer 350, allow for safe contact for main spacer 350 with alignment layer 326 and TFT layer 310. An aperture area 355 lies between spacers 350, 352 and is the area through which light passes to the color-filter layer 320 and then to the user. In one embodiment, aperture area 355 does not include landing areas 354. That is, in one embodiment, landing areas 354 do not include aperture areas, such as aperture area 355. Although not shown in FIGS. 3A through 3C, landing areas 354 may not have a step height and/or alignment layer 326 (and/or a coating area 358) may cover landing areas 354.

Display 302 also includes a coating 358, such as a hard, scratch-resistant coating, the function of which is described in more detail with respect to FIG. 3B. As shown in FIG. 3B, pen 120 applies pressure to the surface of display 302. When pen 120 (and/or fingertip 140) touches display 302, pressure is applied to display 302. The pressure may cause color-filter layer 320 to move, and main spacer 350 and/or sub-spacers 352 may also move. In the example of FIG. 3B, main spacer 350 has moved past landing area 354 and, rather than contacting alignment layer 326, main spacer 350 contacts coating 358 at contact point 360 (which is in aperture area 355 as shown in FIG. 3A). Because, in this example, coating 358 is a hard, scratch-resistant coating, alignment layer 326 is protected and does not scratch (e.g., does not scratch in the aperture area 355). When pen 120 (and/or fingertip 140) is removed, pressure is released, and color-filter layer 320 may return to its original position as shown in FIG. 3A. Main spacer 350 and/or sub-spacers 352 may also move to their original positions on top of landing areas 354. Because of coating 358, alignment layer 326 is not scratched (e.g., as compared to the display in FIG. 2C in the aperture area). As a result, color is rendered correctly, allowing display 302 to maintain brightness (e.g., and save battery life).

As shown in FIG. 3C, pen 120 applies pressure to the surface of display 302. The pressure may cause color-filter layer 320 to move, and main spacer 350 and/or sub-spacers 352 may also move. In the example of FIG. 3C, sub-spacers 252 have moved past landing areas 354 and, rather than contacting alignment layer 326, sub-spacers contact coating 358 at contact points 360-1 and 360-2 (which are in aperture areas). In addition, main spacer 350 has moved past landing area 354 and, rather than contacting alignment layer 326, main spacer 350 contacts coating 358 at contact point 360-3 (which is in aperture area 355 as shown in FIG. 3A). Because, in this example, coating 358 is a hard, scratch-resistant coating, alignment layer 326 is protected and does not scratch (e.g., does not scratch in the aperture area 355). When pen 120 (and/or fingertip 140) is removed, pressure is released, and color-filter layer 320 may return to its original position as shown in FIG. 3A. Main spacer 350 and/or sub-spacers 352 may also move to their original positions on top of landing areas 354. Because of coating 358, alignment layer 326 is not scratched (e.g., as compared to the display in FIG. 2E in the aperture areas). As a result, color is rendered correctly, allowing display 302 to maintain brightness (e.g., and save battery life).

Coating 358 may include an anti-scratch or scratch-resistant coating. Coating 358 may include a film that can be applied to optical surfaces, such as the face of a lens for a camera. In one embodiment, coating 358 does not significantly interfere with the operation of display 302 and/or alignment layer 326. Coating 358 may be permanently bonded with alignment layer 326 and can reduce the likelihood of scratches that would otherwise occur on alignment layer 326. Coating 358 may act as a protective layer, making alignment layer 326 more durable. Coating 358 (e.g., an anti-scratch coating) may be applied via spray, dip, spin, roll, or flow.

Coating 358 may include a diamond-like carbon (DLC) layer. DLC is an amorphous carbon material that has some of the typical properties of diamond (e.g., hardness). For example, coating 358 may include tetrahedral amorphous carbon (ta-C). In one embodiment, coating 358 may be 2 micrometers (μm) thick; less than 2 μm thick; between 2 and 4 μm; between 4 and 6 μm; between 6 and 8 μm; between 8 and 10 μm; or more than 10 μm. As shown, the scratch-resistant coating on the alignment layer is configured to protect the alignment layer in an aperture area when contacted by one of the spacers.

FIGS. 3A and 3B are exemplary and do not show all components of an LCD. In other embodiments, display 302 may include more, fewer, different, or different arrangement of components. For example, in one embodiment, coating 358 and/or alignment layer 326 may cover landing area 354. Display 302 may also include a second alignment layer that lies beneath color-filter layer 320. Display 302 may also include a black matrix that corresponds to main spacer 350 and sub-spacers 352.

Figure 4:
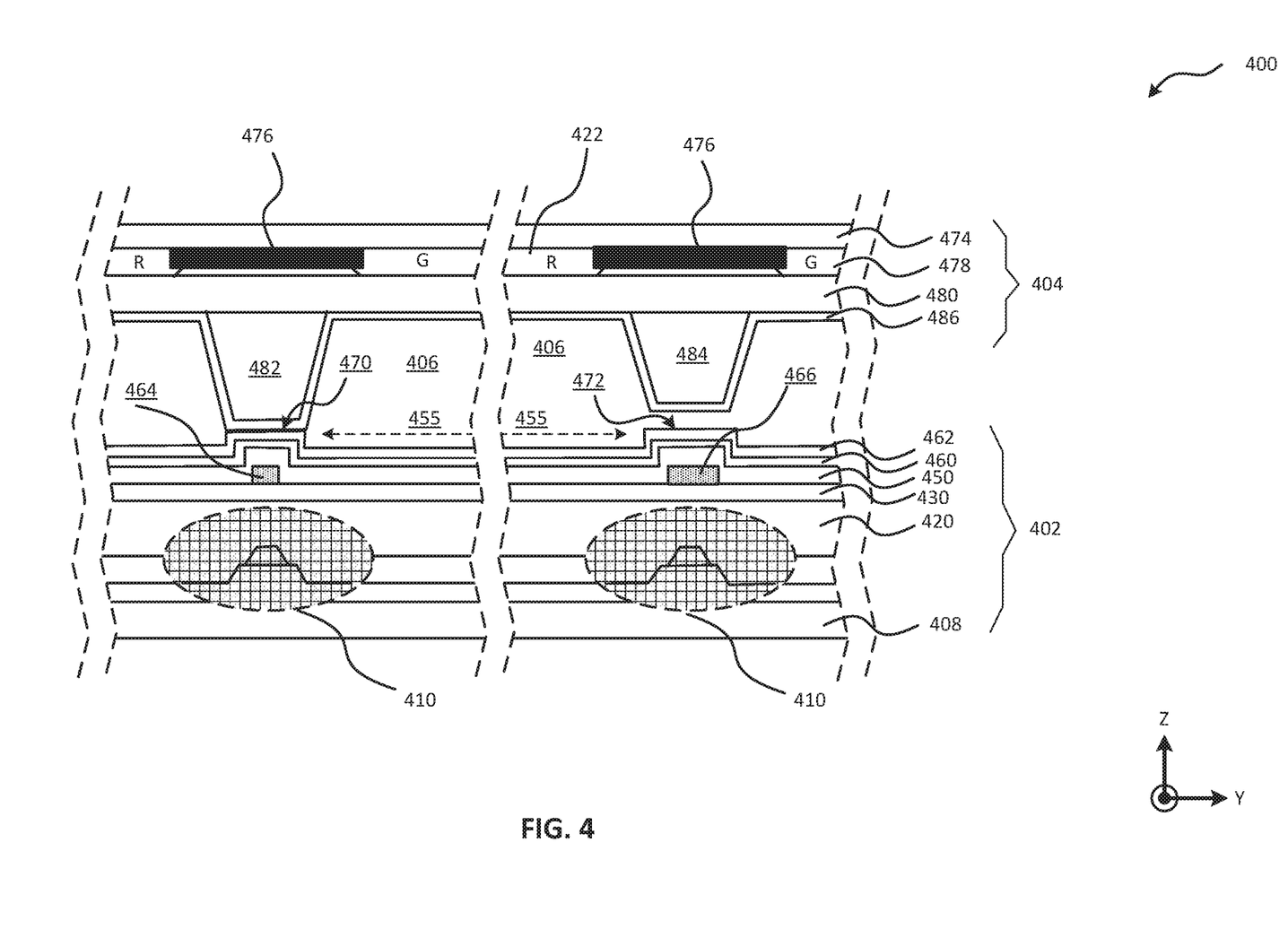
FIG. 4 illustrates an exemplary cross-sectional view of a display according to one embodiment.

FIG. 4 illustrates an exemplary cross-sectional view of a display 400 according to one embodiment. Display 400 includes a TFT layer 402 and a color-filter layer 404. Liquid crystals 406 lie between TFT layer 402 and color-filter layer 404. TFT layer 402 may include a TFT substrate 408, switching elements 410, a planarization layer 420, a common electrode 430, a passivation layer 450, a first alignment layer 460, and a protective coating 462.

In TFT layer 402, data lines and gate lines are formed to cross each other, thus defining pixels. A switching element 410 (e.g., a TFT) is formed for each of the pixels. A planarization layer 420 is formed to cover switching element 410. Planarization layer 420 removes the step created by the layers that form switching elements 410. Common electrode 430, formed on planarization layer 420, supplies a voltage to the pixels. Common electrode 430 may be formed of a transparent conductive material, such as indium tin oxide (ITO) or indium zinc oxide (IZO). Common electrode 430 may be formed to cover TFT substrate 408.

First common lines 464 and second common lines 466 are formed on and contact common electrode 430. Each of first common lines 464 and second common lines 466 may be formed to overlap a corresponding data line, and may be formed of a conductive metal material having a low resistivity, such as copper. Passivation layer 450 may be formed to cover common electrode 430 and common line 464. In one embodiment, passivation layer 450 is formed of an inorganic material. In other embodiments, passivation layer 450 may be formed of an organic material in the alternative or in addition to inorganic material.

A first alignment layer 460 may be formed on passivation layer 450. First alignment layer 460 may be formed of polyimide (PI), for example. In this embodiment, passivation layer 450 and first alignment layer 460 protrude along a profile of common line 464 to form a step height. A landing area 470 is formed by first common line 464. Passivation layer 450 and first alignment layer 460 may also protrude along the profile of second common lines 466 to form landing areas 470 and landing areas 472.

Color-filter layer 404 includes color-filter substrate 474, black matrix 476, a plurality of red (R), green (G), and blue (B) color filters 478, an overcoat layer 480, main spacers 482, sub-spacers 484, and a second alignment layer 486. Black matrix 476 is formed in correspondence with a shielding area, and the red (R), green (G), and blue (B) color filters 478 are formed in correspondence with an aperture area of the pixels.

Black matrix 476 may be formed to overlap switching element 410 formed in TFT layer 402 so as to maximize aperture area 355 of a corresponding pixel. Color filters 478 may be formed by selectively coating and removing red, green, and blue pigments using a mask. Overcoat layer 480 is formed to cover black matrix 476 and the color filters 478.

Main spacers 482 and sub-spacers 484 are formed in an area, corresponding to black matrix 476, on the overcoat layer 480. As described above, main spacers 482 may maintain a cell gap between TFT layer 402 and color-filer layer 404. Main spacer 482 is formed on the color-filter substrate 474 to contact landing area 470 disposed on TFT layer 402. Second alignment layer 486 is formed to cover main spacers 482 and sub-spacers 484. Second alignment layer 486 may be formed of polyimide (PI), for example. Main spacer 482 and sub-spacer 484 may be simultaneously formed by a single mask process.

Main spacer 482 and sub-spacer 484 are formed to overlap switching elements 410 of TFT layer 402 and black matrix 476 of color-filter substrate 474. Main spacer 482 is formed to correspond to landing area 470, and maintains a cell gap between TFT layer 402 and color-filter layer 404. Sub-spacer 484 is formed in correspondence with landing area 472. In one embodiment, sub-spacer 484 may be formed to have a lower height than that of main spacer 482. Aperture area 455 lies between spacers 482, 484 and is the area via which light passes to the color-filter layer 404 and then to the user. In one embodiment, aperture area 455 does not include landing areas 470, 472.

In one embodiment, display 400 also includes a coating 462, such as a hard, scratch-resistance coating. If pressure causes color-filter layer 404 to move, and main spacer 482 moves off landing area 470, coating 462 may protect first alignment layer 460 from being scratched by main spacer 482. Thus, when the pressure is released, color-filter layer 404 may return to its original position as shown in FIG. 4 with main spacer 482 aligned with landing area 470. Because of coating 462, first alignment layer 460 is not scratched and, as a result, color is rendered correctly, allowing display 302 to maintain brightness (e.g., and save battery life).

Like coating 358, coating 462 may include a film that can be applied to optical surfaces, such as the face of a lens for a camera. In one embodiment, coating 462 does not significantly interfere with the operation of display 302 and/or first alignment layer 460. Coating 462 may be permanently bonded with first alignment layer 460 and can reduce the likelihood of scratches that would otherwise occur on alignment layer 460. Coating 462 may act as a protective layer, making alignment layer 460 more durable. Coating 462 (e.g., an anti-scratch coating) may be applied via spray, dip, spin, roll, or flow.

Figure 5A:
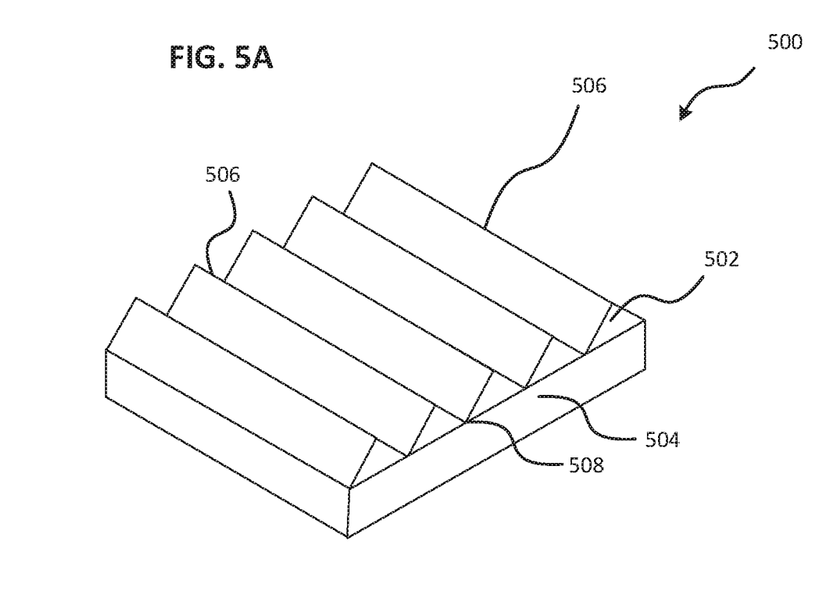
FIGS. 5A and 5B illustrate an exemplary prism film in a display.
Figure 5B:
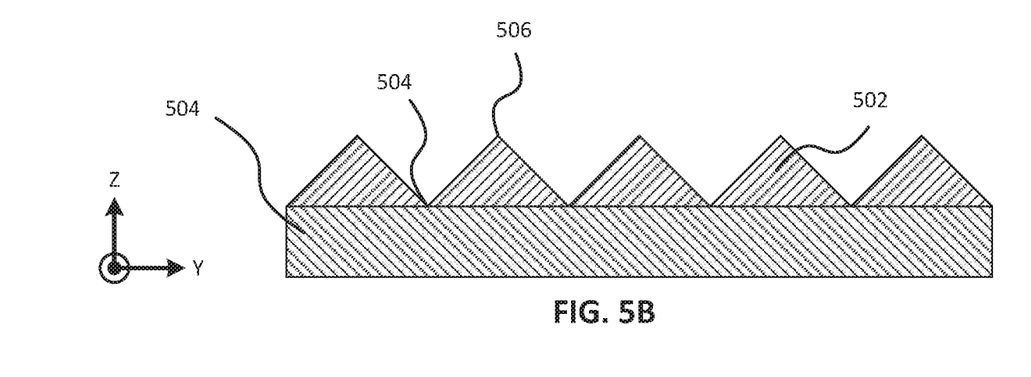

Display 102 (e.g., an LCD panel) may employ a backlight module as a light source. A backlight module can use an optical film (or "prism film") to increase the brightness of display 102, thus maximizing the efficiency of the light source, reducing power consumption, and extending battery life. Using refraction and internal reflection, the prism film converges scattered light rays to enhance the luminance of the LCD panel. FIGS. 5A and 5B illustrate an exemplary prism film 500 in a display. FIG. 5A is a perspective view of prism film 500 and FIG. 5B is a cross-sectional view of prism film 500. In one embodiment, prism film 500 has parallel micro strip-shaped prism structures 502 formed by curing an acrylic resin with UV light on a polyester optical film. The prism structures 502 are arranged on a substrate 504. In this example, each prism structure 502 includes two slant surfaces that meet at the top of the prism to form a peak 506, and prism structures 502 meet to form a groove 508. Prism film 500 shown in FIGS. 5A and 5B are exemplary. Other shapes of prism film 500 are possible.

Prism film 500 is also subject to damage (e.g., scratches) when display 102 is subject to external pressure, such as from fingertip 140, pen 120, or dropping. For example, if display device 100 is bent or if pen 120 or fingertip 140 exerts excessive pressure on display 102, display 102 could fail by rendering color incorrectly or displaying a dark or light spot. Such a failure may result from strain (e.g., a force) deforming, warping, or moving prism film 500. A damaged prism film 500 may result in, for example, a light spot, a dark spot, and/or incorrect color rendering (e.g., a blue and/or red mura defect).

As shown in FIG. 4, each landing area 470/472 includes two edges or steps and the landing areas 470/472 are approximately the same width as spacers 482/484. That is, the edges of each landing area 470/472 may coincide approximately with the sides of each spacer 482/484. In other embodiments, landing areas 470/472 may be wider than spacers 482/484 and/or each landing area 470/472 may include multiple edges to form a well to accommodate spacers 482, 484. Increasing the width of landing areas 470/472, however, may have the effect of reducing aperture area 455 and the brightness of display 302.

Figures 6A, 6B:
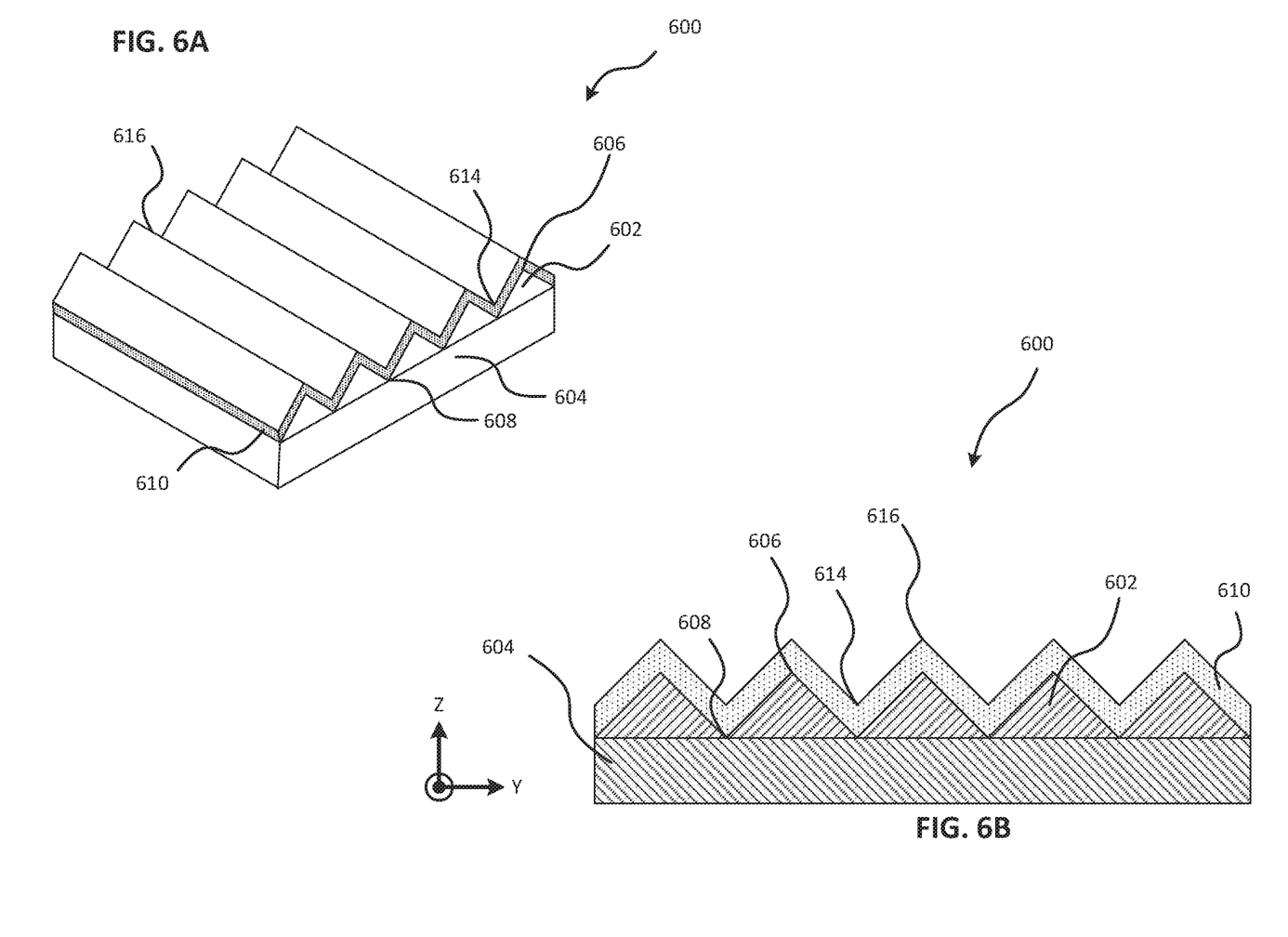
FIGS. 6A and 6B illustrate an exemplary prism film with a protective layer in one embodiment.

FIGS. 6A and 6B illustrate an exemplary prism film 600 with a protective layer in one embodiment. FIG. 6A is a perspective view of prism film 600 and FIG. 6B is a cross-sectional view of prism film 600. In one embodiment, prism film 600 (like prism film 500) has parallel micro strip-shaped prism structures 602 formed by curing an acrylic resin with UV light on a polyester optical film. The prism structures 602 (like structures 502) are arranged on a substrate 604. In this example, each prism structure 602 includes two slant surfaces that meet at the top of the prism to form a peak 606, and prism structures 602 meet to form a groove 608.

Prism film 600 also includes protective layer 610 formed on top of prism structures 602 and substrate 604. Protective layer 610 follows the peaks 606 and grooves 608 of the underlying prism structures 602. Thus, protective layer 610 includes its own grooves 614 and peaks 616 that parallel peaks 606 and grooves 608 of the underlying structures. Protective layer 610 provides additional protection to prism film 600 to avoid damage. As a result, a display incorporating prism film 600 may reduce the chance of damaging prism structures 602, thus avoiding light spots, dark spots, and/or incorrect color rendering (e.g., a blue and/or red mura defect).

Protective layer 610 may include an anti-scratch or scratch-resistant coating. Protective layer 610 may include a film that can be applied to optical surfaces, such as the face of a lens for a camera. In one embodiment, protective layer 610 does not significantly interfere with the operation of prism structures 602. Protective layer 610 may be permanently bonded with prism structures 602 and can reduce the likelihood of scratches and defects that would otherwise occur on the surfaces of prism structures 602. Protective layer 610 may act as a protective layer, making prism structures 602 and/or prism film 600 more durable. Protective layer 610 (e.g., an anti-scratch coating) may be applied via spray, dip, spin, roll, or flow.

Protective layer 610 may include a DLC layer. DLC is an amorphous carbon material that has some of the typical properties of diamond (e.g., hardness). For example, protective layer 610 may include tetrahedral amorphous carbon (ta-C). In one embodiment, protective layer 610 may be 2 μm thick; less than 2 μm thick; between 2 and 4 μm; between 4 and 6 μm; between 6 and 8 μm; between 8 and 10 μm; or more than 10 μm. As shown, the scratch-resistant coating on the prism structures is configured to protect the prism structures when contacted by other components in a display.

Figure 7:
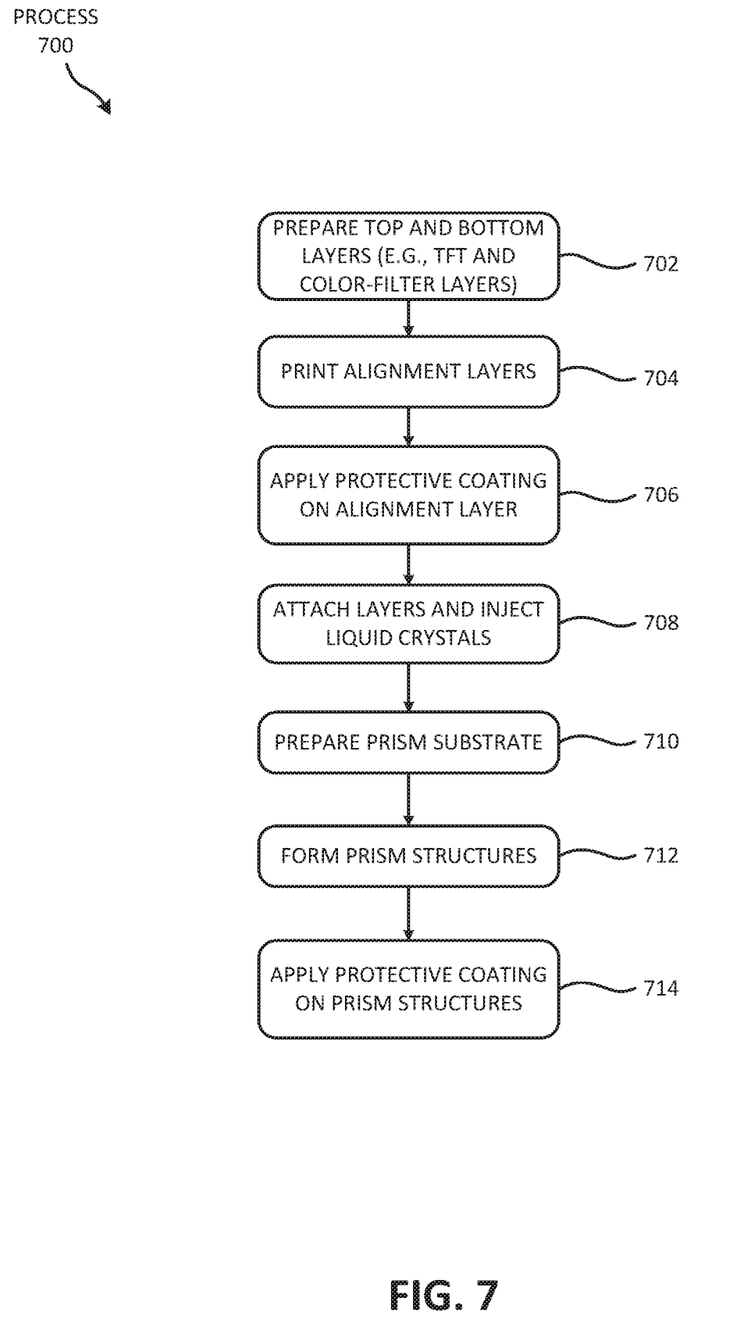
FIG. 7 is a flowchart illustrating an exemplary method of forming an alignment layer with a protective coating in a liquid-crystal display in one embodiment.

FIG. 7 is a flowchart illustrating an exemplary method of forming an alignment layer with a protective coating in an LCD in one embodiment. Process 700 may begin with the preparation of the top and bottom layers of an LCD panel (block 702) (e.g., TFT layer 402 and color-filter layer 404). For example, as shown in FIG. 4, color-filter substrate 474 may be formed along with black matrix 476, color filters 478, overcoat layer 480, main spacers 482, and sub-spacers 484. Further, TFT substrate 408 may be formed along with switching elements 410, planarization layer 420, common electrode 430, and passivation layer 450.

Process 700 continues with the printing of alignment layers (block 704). For example, a polyimide (PI) solution for alignment layers 460 and 486 are printed on the substrates using an alignment printing apparatus. Printing alignment layers may include an alignment process to achieve an alignment direction for the alignment layers.

Process 700 continues with the formation of the protective coating on the alignment layer associated with the TFT layer 402 (block 706). The coating (e.g., coating 358 or coating 462) may be permanently bonded with the alignment layer (e.g., first alignment layer 460). The coating (e.g., coating 462 or 358) may be applied via spray, dip, spin, roll, or flow.

The two layers may be attached (e.g., the TFT layer 402 and color-filter layer 404) and the liquid crystals injected (block 708). Alternatively, liquid crystals are added and the two layers are attached. By attaching the layers (block 708) a display module (a "display") is assembled.

Process 700 may continue with the preparation of a prism substrate (block 710). For example, prism substrate 604 may be prepared as discussed above with respect to FIGS. 6A and 6B. Prism structures (e.g., prism structures 602) are formed on the prism substrate 604 (block 712). Protective layer 610 is then applied to the top of prism structures (block 714). As noted, protective layer 610 (e.g., an anti-scratch coating) may be applied (block 714) via spray, dip, spin, roll, or flow.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise.

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A device comprising:
   a display including:
   a color-filter layer;
   a thin-film transistor (TFT) layer including:
   common lines formed on a common electrode;
   a passivation layer covering the common lines;
   an alignment layer formed on the passivation layer; and
   a scratch-resistant coating on the alignment layer; and
   spacers between the color-filter layer and the TFT layer that form space between the color-filter layer and the TFT layer for liquid crystals, wherein the scratch-resistant coating prevents the spacers from contacting the alignment layer in an aperture area.

2. The device of claim 1, wherein the scratch-resistant coating protects the alignment layer in the aperture area when contacted by one of the spacers.

3. The device of claim 1, wherein the scratch-resistant coating includes a diamond-like carbon layer.

4. The device of claim 2, wherein the display further includes landing areas to accommodate the spacers, wherein the aperture area does not include any of the landing areas.

5. The device of claim 1, wherein the scratch-resistant coating is a first scratch-resistant coating, the device further comprising:
   a prism film to provide light to the display; and
   a second scratch-resistant coating on the prism film.

6. The device of claim 5, wherein the prism film includes prism structures, and wherein the second scratch-resistant coating protects the prism structures from damage.

7. The device of claim 5, further comprising:
   a backlight as a light source to the prism film, wherein the second scratch-resistant coating includes a diamond-like carbon layer.

8. A method comprising:
   preparing a thin-film transistor (TFT) layer, the preparation including:
   forming common lines on a common electrode;
   covering the common lines with a passivation layer;
   printing an alignment layer on the passivation layer; and
   applying a protective coating on the alignment layer;
   preparing a color-filter layer; and
   assembling the TFT layer and the color-filter layer into a display, wherein the TFT layer and the color-filter layer are separated by spacers to form a gap to hold liquid crystals, and wherein the protective coating prevents the spacers from contacting the alignment layer in an aperture area.

9. The method of claim 8, wherein the protective coating includes a scratch-resistant coating.

10. The method of claim 9, wherein the protective coating on the alignment layer is configured to protect the alignment layer in the aperture area when contacted by one of the spacers.

11. The method of claim 8, wherein the scratch-resistant coating includes a diamond-like carbon layer.

12. The method of claim 10, further comprising:
    forming landing areas to accommodate the spacers, wherein the aperture area does not include any of the landing areas.

13. The method of claim 8, wherein the protective coating is a first scratch-resistant coating, the method further comprising:
    forming a prism film on a substrate to provide light to the display; and
    applying a second scratch-resistant coating on the prism film.

14. The method of claim 13, further comprising:
    forming prism structures on the prism film, wherein the second scratch-resistant coating protects the prism structures from damage.

15. The method of claim 13, further comprising:
    assembling the prism film and a backlight into the display, wherein the second scratch-resistant coating includes a diamond-like carbon layer.

16. A device comprising:
    a display including:
    a color-filter layer;
    a thin-film transistor (TFT) layer including:
    common lines formed on a common electrode;
    a passivation layer covering the common lines;
    an alignment layer formed on the passivation layer; and
    a scratch-resistant coating on the alignment layer, wherein the TFT layer includes landing areas;
    spacers formed on the color-filter layer to create space between the color-filter layer and the TFT layer for liquid crystals, wherein the landing areas on the TFT layer accommodate the spacers, and wherein the scratch-resistant coating prevents the alignment layer in an aperture area from being contacted by one of the spacers.

17. The device of claim 16, wherein the scratch-resistant coating includes a diamond-like carbon layer.

18. The device of claim 16, wherein the landing areas include a step and wherein the aperture area does not include any of the landing areas.

19. The device of claim 16, wherein the scratch-resistant coating is a first scratch-resistant coating, the device further comprising:
    a prism film to provide light to the display; and
    a second scratch-resistant coating on the prism film, wherein the prism film includes prism structures, and wherein second scratch-resistant coating protects the prism structures from damage.

20. The device of claim 19, further comprising:
    a backlight as a light source to the prism film, wherein the second scratch-resistant coating includes a diamond-like carbon layer.

* * * * *